US008728361B2

(12) United States Patent
Cai et al.

(10) Patent No.: US 8,728,361 B2
(45) Date of Patent: May 20, 2014

(54) MAKING NANOSTRUCTURED POROUS HOLLOW SPHERES WITH TUNABLE STRUCTURE

(75) Inventors: Mei Cai, Bloomfield Hills, MI (US); Yunfeng Lu, Los Angeles, CA (US); Hiesang Sohn, Los Angeles, CA (US); Qiangfeng Xiao, Los Angeles, CA (US)

(73) Assignees: GM Global Technology Operating LLC, Detroit, MI (US); The Regents of the University of California, Oakland, CA (US)

( * ) Notice: Subject to any disclaimer, the term of this patent is extended or adjusted under 35 U.S.C. 154(b) by 456 days.

(21) Appl. No.: 12/828,353

(22) Filed: Jul. 1, 2010

(65) Prior Publication Data
US 2012/0001354 A1    Jan. 5, 2012

(51) Int. Cl.
B29B 9/00 (2006.01)
(52) U.S. Cl.
USPC .......................................................... 264/5
(58) Field of Classification Search
USPC .......................................................... 264/5
See application file for complete search history.

(56) References Cited

U.S. PATENT DOCUMENTS

2006/0083694 A1    4/2006    Kodas et al.

OTHER PUBLICATIONS

Yunfeng Lu; Aerosol-assisted self-assembly of mesostructured spherical nanoparticles; Nature; vol. 398; Mar. 18, 1999; 1999 Macmillan Magazines Ltd.; pp. 223-226.

Primary Examiner — Larry Thrower
(74) Attorney, Agent, or Firm — Reising Ethington P.C.

(57) ABSTRACT

Hollow, porous, spherical metal-carbon composite particles, having nanostructures, are prepared from suitable precursor solutions containing metal-organic ligand coordination complexes with template. Such precursors may be made for each elemental metal to be in the spherical particles. The precursor solution is atomized as an aerosol in an inert gas stream and the aerosol stream heated to decompose the organic ligand portion of the precursor leaving the spherical metal-carbon composite or metal alloy-carbon composite particles. The organic ligand serves as a structure directing agent in the shaping of the spherical particles after the ligand has been removed. Other materials may also be used as permanent or removed templates. The morphology of the particles may be altered for an application by varying the preparation and composition of the metal precursor material, and the optional use of a template.

20 Claims, 4 Drawing Sheets

MAKING NANOSTRUCTURED POROUS HOLLOW SPHERES WITH TUNABLE STRUCTURE

TECHNICAL FIELD

This invention pertains to making nanostructured particles. More specifically, this invention pertains to methods of making spherical particles which are a composite of a metal or metal alloy and carbon, where the dominant component of the composite is the metal or metal alloy. Further, the spherical metal-carbon composite particles are characterized by porous hollow interiors. An aerosol assisted process is employed using solutions containing coordination complexes of the metal(s)

BACKGROUND OF THE INVENTION

Various practices, usually very complicated and cumbersome, have been devised to prepare inorganic hollow nanostructures. Some of these very small particles have been of interest owing to a wide variety of applications in optical, electronic, magnetic, catalytic, and sensing devices ranging from photonic crystals to drug-delivery carriers. There remains a need for a relatively simple method of preparing metal-carbon composites and metal alloy-carbon composite materials in the form of porous, hollow, spherical nanostructures.

SUMMARY OF THE INVENTION

Methods are provided for the making or fabricating of porous, hollow, spherical nanostructure composites of individual metals, such as nickel or platinum with carbon, and for the making or fabricating of such composites of metal alloys with carbon, such as $Ni_{19}Pt$—C and $Ni_3Pt$—C. In embodiments of the invention, a precursor in the form of a coordination complex of the metal with an organic ligand is formed as a solution or dispersion in a suitable solvent. Metal-carbon composite particles are ultimately formed from the solution or dispersion, by an aerosol-forming and thermal degradation process, as will be fully described in a following paragraph.

The organic ligand may be a small molecule or a polymer whose molecular weight is less than 150,000. Examples of suitable organic ligands include small molecules with saturated or unsaturated carbon chains and with a mercapto group, amine group, carboxylic group, or hydroxyl group for forming a coordination complex with metal ions or species in the liquid medium. Poly oxyethylene group-containing ethers and block copolymers that have surfactant properties are often suitable ligands. Other suitable polymers may also contain like functional groups for the same purpose. Suitable organic ligands combine with the metal(s) species in the solvent to form a coordination complex for the shaping of the ultimate metal-carbon complex particles. Organic aliphatic acids of three to twenty four carbon atoms in a saturated or unsaturated carbon chain are further examples of suitable ligands. Hydrocarbon molecules containing an aforementioned functional group are suitable ligands. And a block copolymer of polyethylene glycol and polypropylene glycol blocks, for example, may be employed as a polymeric organic ligand. In some embodiments of the invention, the ligand portion of the metal-ligand complex acts a structure directing agent, like a surfactant, in the solution or dispersion and serves to shape the ultimate spherical metal-carbon particles. This practice is referred to herein as non-template embodiments of the invention. In other embodiments of the invention, particles of a polymer or silica, or the like may be added to the dispersed metal-ligand complex as a template material to further contribute to the ultimate shaping of the metal-carbon particles.

Tetrahydrofuran (THF) is an example of a volatile solvent or dispersant for many metal-ligand complexes used in embodiments of this invention. THF is liquid at ambient temperatures often used for formation of the metal complexes and THF dissolves or disperses them for the following aerosol-forming and metal-organic complex decomposing method for obtaining and shaping the porous, hollow, metal-carbon complex spherical particles of this invention.

The liquid precursor solution of the organic-metal complex(es) is placed in an atomizer vessel and aerosol droplets are formed from the solution and withdrawn in a channeled stream of nitrogen or other suitable inert gas. The aerosol droplets of the organic-metal complex(es) and vaporizing solvent are carried in the stream of inert gas and conducted through a tubular furnace (or the like) at a temperature of, for example, about 450° C. It is understood that the droplets of the organic-metal complex in the aerosol are generally spherical with organic ligand moieties gathered inwardly in the small spheres. The aerosol materials are rapidly heated and several processes occur simultaneously and within a period of a few seconds. The solvent vaporizes and the organic ligand material decomposes into vaporous byproducts. A portion of the ligand material remains as a residue of carbon with the metal(s). Small hollow spherical metal-carbon composite particles remain in the flowing stream. The spherical particles are filtered from the stream, collected and calcined to remove residual organic material or to transform it into carbon and leave hollow spherical, porous metal-carbon composite or metal alloy-carbon composite particles. Typically, the metal constitutes more than fifty percent by weight of the composite particles.

As stated above, the porous character of the hollow spherical particles may be tuned or adjusted by the use of suitable organic ligands or the porous character may be adjusted by using separate template materials in combination with the organic ligands. In some embodiments of the invention (non-template method), the formation of metal-organic ligand complexes may be managed in a solution or dispersion so that the ligands act as a structure directing agent, like surfactants, as they organize themselves (and the complexed metal atoms) in the aerosol droplets as the solvent is vaporized, and as the ligands decompose from the metal constituents in the shrinking droplets. In other embodiments of the invention (template method), template materials are dispersed in solutions of preformed metal-organic ligands and the templates contribute (upon heating of the aerosol) to the shape of metal-carbon complex spherical particles.

In the non-template embodiment of the invention, it is preferred to disperse or dissolve a metal salt and an organic ligand in a suitable solvent. An example of such a precursor includes the mixture of nickel nitrate and hexanoic acid where one mole of nickel nitrate and two moles of hexanoic acid (as an organic ligand) are reacted. In this non-template method, the organic ligand is a substance acting as a structure-directing agent, like the action of a surfactant, by forming a vesicular structure via self-assembly and which yields hollow spherical metal-containing particles when organic material is removed through decomposition. A suitable organic ligand organizes the metal ions or species in a coordination complex in the liquid vehicle and in the aerosol droplets of the vehicle leading to the shaping of the metal-carbon complex in resulting hollow spherical particles.

The molar proportions of the metal salt and the organic ligand may be varied to obtain a different morphology or porous structure. Hence, the liquid solution or dispersion containing mixture, with a predetermined ratio of metal salt(s) and aliphatic acid(s), for example, is converted to an aerosol in an inert gas stream, and, by heating, readily forms hollow inorganic particles. The nanostructure of the small hollow spherical particles may also be varied by changing the materials in forming the initial organic-metal ligand coordination complex. There are several ways of changing the ingredients in the preparation of the organic-metal ligand coordination complexes that can produce changes in the nanostructure of the fabricated metal spheres. For example, it is found that the anion of the metal salt (e.g., chloride, nitrate, acetate, or other anions) may be varied in preparation for reaction with an organic ligand. And the metal nanostructures may be altered with variations in the composition, amount, and acidity of the organic ligand material used in forming the initial organic-metal complex or mixtures of organic-metal complexes. If spherical particles containing two or more metals are to be formed, suitable salts of each metal are added to the organic ligand-containing solution.

In embodiments of the invention in which templates are used, it may be preferred to dissolve or disperse preformed metal-organic acid compounds in the solution. For example, nickel (II) oleate, where two moles of oleic acid are reacted with one mole of a suitable nickel (II) salt, is dispersed in the solution together with a suitable quantity of particles of a desired template material. If spherical particles containing two or more metals (a metal alloy) are to be formed, separate precursors are prepared, such as nickel oleate and platinum oleate, for each metal to be included in the alloy and carbon composite. These precursors of organic-metal complex compounds are prepared and dissolved or suspended so that the respective metals are proportioned, as wanted, in the hollow spherical products of metal alloy-carbon composite particles.

In the template method, a template material such as polystyrene spheres is mixed with the precursor as a sacrificial material, acting as a temporary substrate or template. When the polystyrene spheres are decomposed and vaporized from the aerosol, they complement the organic ligands in forming hollow, metal-based spherical structures. In detail, as the liquid solution or dispersion is converted to an aerosol, organic-metal ligand coordination complex material readily forms on individual, very small, light-weight polystyrene spheres. As the beaded, organic-metal complex-containing aerosol droplets are carried in the inert gas stream through the furnace, the polystyrene templates and the organic ligands are both decomposed and removed from the residual hollow spherical metal-carbon composite particles. Other template materials may include, for example, emulsion droplets, colloid particles, carbon particles, silica particles, carbon nanotubes, and polymer particles including porous polymer monoliths, resin spheres, polyaniline, poly (methyl methacrylate), polypyrrole, and melamine formaldehyde polymer particles. Carbon and silica particles will remain in the spherical particles. The examples of templates are not limited to above.

Where the metal-carbon composite particles to be formed are intended to be used, for example, with carbon or silica supports, such materials may be used as templates. And where the template material is only used in shaping the spherical particles, it is preferred to use polymeric materials that are decomposed and removed with the organic ligand (except for some residual carbon). Thus, the use of polymer spheres as templates in an organic-metal complex aerosol is another useful way of modifying the nanostructure of the hollow spherical metal-carbon composite or metal alloy-carbon composite particles produced by methods of this invention. The template material is, thus, used in combination with the always-present organic ligand.

Practices of the invention are illustrated in this specification with respect to the making of metal-carbon composite particles containing nickel, platinum or both metals. However, the methods of this invention are applicable to many metals. For example, the methods of this invention are applicable to Group VIII metals such as iron, cobalt, nickel, ruthenium, rhodium, palladium, and platinum; suitable Groups IB and IIB metals such as copper, zinc, silver, cadmium, and gold; and suitable Group IVA metals such as tin and lead.

Hollow spherical metal or metal alloy nanostructures produced by this invention may be observed and characterized using microscopy, x-ray diffraction, elemental x-ray microanalysis, nitrogen absorption data and the like. As described below in this specification, hollow spherical metal-carbon composite particles of nickel and/or platinum-carbon composite have been evaluated as catalysts in, for example, the hydrogenation of propylene as a practice for discerning differences in nanostructures.

Other advantages and applications of the invention will become apparent from detailed descriptions of illustrative embodiments which follow in this specification. The described practices are chosen to illustrate embodiments of the invention and not as limitations of its scope.

BRIEF DESCRIPTION OF THE DRAWINGS

FIGS. 2A-2D are transmission electron microscope (TEM) images, respectively, of hollow metal-C spheres made using nanometer size polystyrene template particles. FIG. 2B illustrates hollow $Ni_{19}Pt_1$—C spheres. FIG. 2C illustrates hollow $Ni_3Pt_1$—C spheres, and FIG. 2D illustrates hollow Pt—C spheres. The scale-bars in the respective figures represent one hundred nanometers in length.

FIGS. 3A-3C are TEM images, respectively of hollow metal-carbon composite spheres produced without using separate template particles.

FIGS. 4A and 4B are TEM images of hollow metal-carbon composite spheres produced without using separate template particles.

FIG. 5 is a TEM image of hollow nickel-carbon spheres produced without using separate template particles.

FIGS. 6A and 6B are TEM images of hollow metal-carbon composite spheres produced without using separate template particles.

DESCRIPTION OF PREFERRED EMBODIMENTS

It is found that very small porous hollow, spherical metal-carbon composite or metal alloy-carbon composite particles with nanometer size pores may be formed using an aerosol process. The spherical particles are typically smaller than one micron in diameter with internal porosity such that they are characterized as porous hollow particles.

Hereafter, metal-carbon composites or metal alloy-carbon composites may be sometimes be referred to as metal/metal alloy particles for brevity, since the major component of metal-carbon or metal alloy and carbon composite is metal or metal alloy (typically over 70%) based on elemental analysis result by EDX (Energy Dispersive X-ray Spectroscopy) and characteristics of product show that of metal or metal alloy. However, most products made in accordance with practices of this invention are not pure metal particles but are metal-carbon composite particles.

In general, an elemental metal, or two or more elemental metals, are identified for preparation in the form of such porous hollow spherical particles. A suitable salt of the metal is prepared for combination with a chosen organic ligand which functions as a structure directing agent, like a surfactant, in a dissolved coordination complex product. The coordination complex is formed or placed in a liquid medium. In many embodiments of the invention, the organic ligand is preferably a generally straight molecular chain of aliphatic acid with three to twenty four carbon atoms and which may be either unsaturated or saturated. In the following paragraphs of the specification, metal spherical particle forming methods involving the use of nickel or platinum or mixtures of nickel and platinum will be presented as non-limiting illustrations of the invention. Small hollow, porous, spherical particles of nickel and platinum are candidates for catalyst applications in many different products, and in other applications for small conductive particles with large surface areas. But practices of the invention are applicable to metals generally and not limited to nickel and platinum.

In the following illustrative practices, the following chemicals were used: platinum hydrochloride ($H_2PtCl_6$), nickel(II) chloride hexahydrate, nickel (II) nitrate hexahydrate, nickel (II) acetate tetrahydrate, sodium hydroxide (NaOH), 2-mercaptoethanol, polyacrylic acid (Mw. 1800), poly(ethylene glycol)-block-polypropylene glycol-block-poly(ethylene glycol) (Pluronic® P123: Mw. 5800), polyoxyethylene lauryl ether (Brij® 30), polyoxyethylene-cetyl ether (Brij® 56), polyethoxylated alcohol (Brij® 92V), polyvinylpyrolidone (PVP), styrene, 2-hydroxylethylmethacrylate, ammonium persulfate, oleic acid, hexanoic acid, decanoic acid, myristic acid, stearic acid, formic acid, acetic acid, hydrochloric acid solution (37.5%), nitric acid (70%), absolute methanol, hexane, and tetrahydrofuran (THF) were purchased from Aldrich Chemical Co. Deionized water (DI-water) was used. All these chemical reagents were of analytical grade and used without further purification.

It will be seen that tetrahydrofuran is a very useful solvent for the solution of metal salts and organic ligands in practices of this invention. It is liquid at ambient temperatures often used for preparation of metal-organic ligand complexes. It readily forms aerosols of the complexes and it is easily vaporized during thermal degradation of the complexes. THF displays moderate polarity and is miscible with water, methanol, ethanol, and the like. Examples, of other chemically related solvents include 1, 4 dioxane and butyl alcohol. But the practice of this invention is not limited to these solvents.

As will be demonstrated, various aliphatic organic acids, as an example of a group of suitable organic ligands, may be employed with a metal to obtain variations or modifications in the morphology of resulting metal or metal alloy particles because these organic acids act as structure directing agents, like surfactants, for the fabrication of the hollow metal particles. However, in some practices of the invention, particles of nickel or platinum (or both) may be formed from their organic acid or other aliphatic acid precursors with the addition of templates. In the following illustrative examples, solutions of the coordination complex precursors of nickel or platinum were prepared with and without template materials.

Preparation of Metal-Organic Ligand Precursors to Make Hollow Inorganic Spheres by a Non-Template Method For the precursor preparation in a non-template method, the aliphatic organic acids were selected as appropriate organic ligands in part because it was perceived by the inventors that these organic acids would serve as a structure directing agent, like a surfactant, in the formation of the aerosols leading to the formation of the porous spherical metal nano structures. Further, the organic acids were selected because it was perceived that they would decompose in the aerosol at suitable temperatures, leaving some residual carbon. In the following illustrations, several different ways to prepare the precursor for hollow metal particles in the non-template method are described. For example, the molecular chain length of the aliphatic acid may be varied. Or the ratio between metal nitrate (or another anion) and organic ligand may be varied. The species of metal salt or organic ligand and the acidity of a precursor may be varied to tune the morphology of the formed spherical metal-carbon particles. Such changes in the formation of the precursor may produce visible microscopic changes in the porous hollow spherical particles. But, more often, the variations in particle morphology are seen in the performance of the particles in a particular application or mode of use.

Illustrations of fabrication processes based on non-template methods now follow in this specification. In these examples the metal salts and organic ligands were simply combined in a common solvent, often tetrahydrofuran.

Employing Organic Ligands of Different Molecular Chain Length

The molecular length of the organic ligand in a precursor solution may be used to alter pore size and formation in the porous particles. In general, the use of generally straight molecular chain aliphatic acids having three to twenty two carbon atoms or hydrocarbon molecular chains of sixteen to twenty six carbon atoms containing polyethylene glycol (PEG) groups are suitable for making precursors. Those organic ligands may display a single unsaturated site (—CH=CH—) in the (—$CH_2$—$CH_2$—) molecular chain. However, it is sometimes preferred to use (or start by using) shorter chain aliphatic acids having three to twelve carbon atoms per molecule or hydrocarbon chain of sixteen to twenty four carbon atoms per molecule containing the polyethylene glycol (PEG) group. For example, one might start with hexanoic acid or Brij® 30 to make porous, hollow spherical nickel as follows; 2.9 g of nickel nitrate (Ni (NO$_3$)$_2$) and 2.32 g of hexanoic acid or 2.9 g of Brij® 30 were dissolved in 100 mL of THF solvent at room temperature.

Other organic ligands including acrylic acid, decanoic acid, and myristic acid, 2-mercaptoethanol, Brij® 56 and Brij® 92V can be employed to make or tune the hollow nanostructure.

Employing Different Morphological Parameters with Varying 1) the Ratio of Metal Salt and Organic Ligand, 2) Species of Metal Salts and 3) Degree of Acidification of Precursor Solution 1) Varying the Ratio of Metal Salt and Organic Ligand Another method of affecting the morphology of the fabricated spherical particles is to vary the molar ratio of metal ions and organic ligands in the precursor solution prior to aerosol processing. Fabrication of hollow porous metal particles with varying morphologies has been carried out by simply varying molar ratio of metal nitrates and organic ligands in the precursor solution.

In the following illustrative example, precursor solutions of different mole ratios between metal nitrate and organic ligands were prepared as aerosol precursor. More specifically, oleic acid, Brij® 92V, and P123 block-co-polymer were selected as appropriate organic ligand for demonstration.

A precursor solution was prepared with a non-stoichiometric ratio of nickel nitrate and oleic acid: 5.8 g of nickel nitrate ($Ni(NO_3)_2$) and 2.82 g of oleic acid were dissolved in 100 mL of THF solvent at the mole ratio of 2:1 between nickel nitrate and oleic acid. Similarly, 5 g of nickel nitrate ($Ni(NO_3)_2$) and 1 g of Brij 92V or P123 block-co-polymer were dissolved in 100 mL of absolute methanol solvent (or DI-water) at the weight ratio of 3:1 between nickel nitrate and Brij 92V or P123 block-co-polymer. Thus, a predetermined ratio of nickel ions and organic ligand molecules was prepared. In accordance with varying practices of the invention, the mole ratio between nickel nitrate (or other nickel salts) and oleic acid (or other organic ligand) can be varied from 1:1 to 16:1 (mole/weight ratio) to tune or produce sought variations in the morphology of resulting porous hollow metal-carbon spheres.

During the aerosol process, precursor concentration is enriched on the surface of droplet because of solvent evaporation and outward diffusion of precursor. The more active the nickel nitrate facilitates surface nucleation, therefore leading to the hollow structure. And other variations in metal anions and proportions of metal ions and ligand molecules or the concentration of precursor solution, produce variations in the morphology of the metal-carbon products.

In addition to the result of changing the ratio of nickel nitrate and aforementioned examples of organic ligands to control the morphology, varying species of metal salt or organic ligands, and the acidity of a precursor solution provide another way to control morphology of the materials.

2) Varying Species of Metal Salts

In the following illustrative example, various metal salts and organic ligands were employed for preparation of precursor solutions where mole/weight ratio between inorganic metal salt and organic ligands is fixed to 2:1 (mole ratio) or 5:1 (weight ratio) and no acid was added to the precursor.

Preparation of a mixture of a metal (nickel) salt and organic ligand: 5.74 g of nickel chloride ($NiCl_26H_2O$) and 2.82 g of oleic acid were dissolved in 100 mL of absolute methanol solvent (or DI-water) at the mole ratio of 2:1 between nickel chloride and oleic acid. Similarly, 5 g of nickel chloride ($NiCl_26H_2O$) and 1 g of Brij® 92V or P123 block-co-polymer were dissolved in 100 mL of absolute methanol solvent at the weight ratio of 5:1 between nickel chloride and Brij® 92V or P123. Other metal salts including nickel nitrate and nickel acetate can be employed to make or tune the hollow nanostructure.

3) Varying Degree of Acidification of Precursor Solution

In the following illustrative example, the acidity of precursors were varied by acidification of a precursor solution with hydrochloric acid, nitric acid, acetic acid, formic acid, or the like where species of metal salt was set as metal nitrate and mole ratio between inorganic salt and organic ligand was fixed to 2:1.

Preparation of mixture of nickel nitrate and oleic acid in different acidification: 5.8 g of nickel nitrate ($Ni(NO_3)_2$) and 2.82 g of oleic acid were dissolved in 100 mL of absolute methanol solvent with addition of 1 mL of formic acid at the mole ratio of 2:1 between nickel nitrate and oleic acid. Similarly, 5 g of nickel nitrate ($Ni(NO_3)_2$) and 1 g of Brij® 30 or P123 block-co-polymer were dissolved in 100 mL of absolute methanol solvent (or DI-water) with addition of 1 mL of hydrochloric acid at the weight ratio of 5:1 between nickel nitrate and Brij® 92V or P123. Other acids including hydrochloric acid (or formic acid), nitric acid, acetic acid or the like may be employed to make or tune the hollow nanostructures.

Preparation of Precursors to Make Hollow Metal-Carbon Composite Spheres using a Template Method In the following illustrations, the metal-organic ligand complexes were dissolved in suitable solvents and were dispersed with nanometer size polystyrene spheres which served as templates. As described above in the non-template method, the organic ligands were selected because they serve as structure directing agent or surfactants in the formation of the aerosols leading to form the metal spherical nanostructures and they would decompose in the aerosol at suitable temperatures. In these following template practices it is often preferred to prepare a precursor solution for the formation of an aerosol in which a preformed organic-metal ligand complex is dissolved in a suitable solvent such as THF.

As representative materials, nickel and platinum coordination complexes were prepared using metal salt and organic ligands and precursors for nickel and platinum spheres were prepared as follows in a first series of experiments.

Synthesis of nickel oleate: 1.30 g of $NiCl_2$ was dissolved in 100 mL of methanol, and then 5.5 mL oleic acid was added. A NaOH solution with 0.8 g of NaOH in 200 mL of methanol was dropped into the solution under magnetic stirring conditions. The reaction was carried out for one hour. The observed green precipitate of Ni (II) oleate was extracted with hexane. The solvents were removed under vacuum overnight.

Synthesis of nickel-polyacrylate (Ni-PAA): 2.49 g of nickel acetate was dispersed in tetrahydrofuran, and then 5 g of polyacrylic acid was added under magnetic stirring conditions at high temperature. The reaction was carried out for four hours and the solvents were removed under vacuum overnight. Nickel polyacrylate compound was obtained.

Synthesis of platinum oleate: 2 g of $H_2PtCl_6.6H_2O$ was dispersed in hexane, and 11 mL oleic acid was added under magnetic stirring conditions at high temperature. The reaction was carried out for four hours and the solvents were removed under vacuum overnight. Pt (IV) oleate was obtained. The synthesis of platinum-polyacrylate compound can be carried out by use of similar approach for the synthesis of nickel-polyacrylate.

In the following illustrative examples, solutions of the coordination complex precursors of nickel or platinum were prepared, dissolved in THF and dispersed with predetermined quantities of very small template particles.

Nanometer-size polystyrene particles represent one example of a template material. Such polystyrene particles were prepared as follows.

Spherical polystyrene (120 nm): Dissolve 3 g of PVP (polyvinylpyrollidone) into 120 mL of deionized water for 30 min at 70° C. After the addition of 15.4 g of distilled styrene to the solution, the mixture was stirred for 10 min followed by addition of 0.7 g of HEMA (2-hydroxylethylmethacrylate) for 20 min with stirring. Finally, a solution of 2 g of ammonium persulfate in 10 g of water was added to mixture and kept stirred for 4 hours in 70° C. Polystyrene particles were filtered from the polymerization media.

In the following illustrative example, solutions of the coordination complex precursors of nickel or platinum were prepared with dispersion of polystyrene template particles.

Preparation of hollow Ni and Pt precursor: Typically 6.21 g of nickel oleate (or 7.5 g of nickel-polyacrylate compound) or 13.23 g of platinum oleate was dissolved in 100 mL of tetrahydrofuran (THF) at room temperature. Then, 0.9315 g of polystyrene spheres was homogeneously dispersed in the THF solution with sonication.

Also, there is interest in preparing hollow spherical particles of metal alloys such as, for example, alloys of nickel and platinum. Preferably, aliphatic organic acid-containing precursors of these metals may be prepared as follows.

Preparation of hollow $Ni_xPt_{1-x}$ alloy precursor: Different amounts of metal oleate were tried to synthesize hollow NiPt alloy (actually a NiPtC complex). For example, to make $Ni_{19}Pt_1$ alloy, 11.837 g of nickel oleate and 1.323 g of platinum oleate were dissolved in 100 mL of THF under sonication at room temperature. Then, 1.974 g of polystyrene sphere was homogeneously dispersed in the solution with sonication.

Thus, as illustrated in the above illustration, various kinds of precursors including nickel oleate, nickel-polyacrylate compound and platinum oleate coordination complex precursors were prepared with dispersion of template particles such as polystyrene particles. Both the precursor solutions based on non-template method and template method are suitable for fabrication into hollow spherical metal-carbon composite particles by an aerosol-forming and thermal degradation process, and the morphology of the resultant particles will be affected by these specific precursor formulations. Accordingly, attention is now turned to a description of an aerosol-forming and thermal degradation process for fabricating metal particles from such precursor materials.

Aerosol Forming and Thermal Reaction Process

Figure 1:
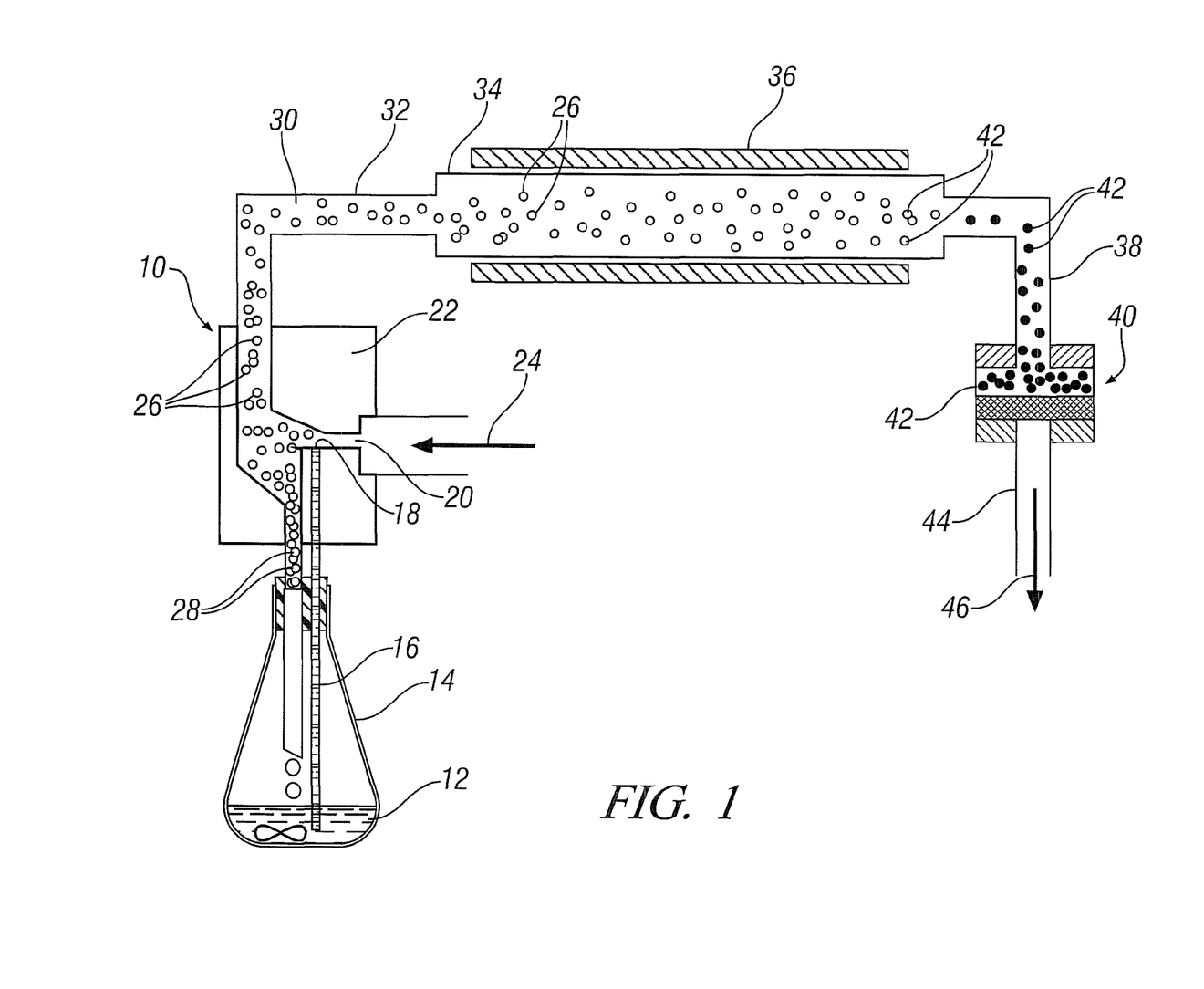
FIG. 1 is a schematic illustration of apparatus for forming an aerosol in an inert gas stream from a solution of metal-organic ligand coordination complex precursors in an illustrative practice of the invention. The aerosol is carried through a tube furnace maintained at an elevated temperature to decompose the organic ligand (and any polymeric template material) leaving hollow, porous, spherical metal-carbon composite particles that are collected and calcined.

FIG. 1 is a schematic drawing, partly in cross-section, illustrating the use of a commercial laboratory size atomizer 10 (Model 3076, TSI, Inc. St. Paul, Minn.) operated with nitrogen as a carrier/atomization gas. This atomizer produces aerosol droplets with a size distribution characterized by a geometric standard deviation of 2 (95% of the liquid particles have diameters between 0.25 and 4 times the mean diameter).

A precursor solution 12 of one or more metal-organic ligand precursor compositions (as described above in this specification) is placed in a suitable container or reservoir 14. In this example, a solution of metal ions and organic ligands serve alone as structure directing agent like surfactant in the fabrication of the hollow spherical metal particles. In some embodiments of the invention, precursor solution 12 may contain dispersed nanometer-size particles of a template material such as polystyrene particles, poly (methyl methacrylate) particles, or the like. These particles have not been illustrated in precursor solution 12. In these other embodiments of the invention, the metal-ligand materials and the template polymer particles combine in their effect in shaping the hollow spherical metal particles.

A vertically-oriented draw tube 16 provides a passage for a stream of the precursor solution 12 from its reservoir 14 to pinhole 18, an opening into atomization gas inlet 20 in the atomizer body 22. A stream of nitrogen gas (or other suitable atomization gas), indicated by directional arrow 24 is introduced into atomization gas inlet 20, reducing the pressure at pinhole 18. In an illustrative operation of atomizer 10, nitrogen gas under an initial pressure of 40 psig was introduced under laminar flow condition through inlet 20 into the atomizer body 22 at a flow rate of 2.6 L (STP)/min. This nitrogen gas flow produced a pressure drop at pin hole 18, permitting the atmospheric pressure acting on solution 12 to push a stream of the precursor solution up through draw tube 16 to pinhole 18. Precursor solution entering the atomization stream 24 is converted to very small aerosol particles 26 (schematically enlarged in FIG. 1). As stated above, the aerosol particles vary in size. Some of the larger particles 28 fall back as liquid droplets into precursor solution 12. But many of the aerosol particles 26 are carried in the flow of atomization gas 24. This combined stream of nitrogen gas and aerosol particles 26 leaves the atomizer body 22 in tubular passage 32 and is now indicated as combined stream 30 in FIG. 1. Continually-flowing combined stream 30 now also contains vaporized solvent from precursor solution 12.

Combined stream 30 enters the inlet end of a one-inch inside-diameter, round glass/quartz/ceramic tube 34 which is enclosed in an electrical resistance heated tubular furnace 36. Furnace 36 is controlled to heat glass/quartz/ceramic tube 34 and the combined stream 30 to about 450° C. The residence time (a second or so) of the flowing combined stream 30 in tube 34 is suitable for the heat to cause substantially complete degradation of the organic ligand material (and any polymeric template material, if present, in combined stream 30). Combined stream 30 now contains metal particles (with some residual carbon) 42, degradation products from the ligand material and solvents, as well as the nitrogen atomization gas. Combined stream 30 exits glass/quartz/ceramic tube 34 through passage 38 and is directed through filter 40. Filter 40 is heated and maintained, for example, at about 80° C. It collects the metal-carbon particles 42 while permitting the exhaust stream 46 of nitrogen and ligand degradation products through outlet passage 44.

This aerosol forming process, with respect to the precursor solution, and subsequent ligand degradation steps (and template material degradation) may be conducted on a batch or continuous basis until the precursor solution is utilized.

The now-fabricated, hollow, spherical metal-carbon composite particles may be calcined, for example at about 550° C. for 30 minutes in a nitrogen atmosphere, to remove or carbonize any remaining organic substances.

Without intending to be limited by a proposed understanding of metal-carbon particle formation, it is believed that forming of the porous hollow spherical metal-carbon composite particles involves the following mechanisms. As the aerosol particles are carried in nitrogen stream toward and into the tube furnace, solvent starts to evaporate and the very small particles shrink further. Metal ions or atoms start to form a metal skin or shell by a surface nucleation process on the shrinking droplets. The organic ligand moieties tend to concentrate on the inside of the droplets. The organic material decomposes and leaves pores on the inside of the shell as the metal shell layer continues to grow. Much of the organic material is expelled through and from the metal shell, but some carbon remains. The morphological characteristic of the metal shells and porous interiors of the particles are a function of the original precursor materials which enter the aerosol particle.

However understood, this aerosol process and suitable variations permit the atomization and aerosol formation of the metal-organic ligand precursor materials and their processing into hollow, porous metal-carbon composite spherical particles.

The following experimental examples of these practices are illustrated with respect to the preparation of nickel and platinum containing precursors. But the practices are not limited to these metals. They are generally applicable to any metal(s) from which it is desired to produce hollow porous metal spherical particles.

Figure 3A:
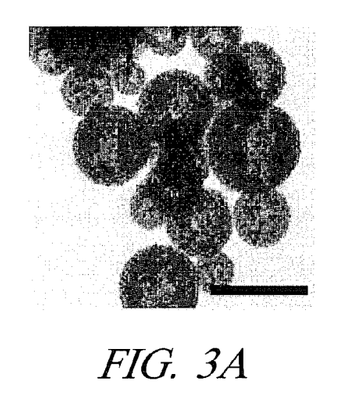
FIG. 3A illustrates hollow Ni—C spheres made using nickel nitrate and hexanoic acid.

Experimental
Non-template Method 2.9 g of nickel nitrate (Ni ($NO_3$)$_2$) and 2.32 g of hexanoic acid (HOOC—($CH_2$)$_4$—$CH_3$) were dissolved in 100 mL of THF solvent at room temperature. This dispersion of nickel nitrate and hexanoic acid was processed as the precursor solution as utilized in connection with the aerosol process described above with reference to FIG. 1. Nanometer size, porous hollow, spherical particles of nickel-carbon were thus obtained. Their composition was confirmed by X-ray diffraction, and energy-dispersive X-ray microanalysis. A transmission electron microscope image of some of the spherical nickel particles is presented in FIG. 3A. The scale-bar in FIG. 3A represents 100 nanometers.

Figure 3B:
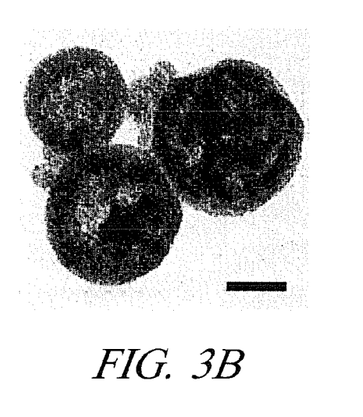
FIG. 3B illustrates hollow $Ni_{19}Pt$—C spheres made using nickel nitrate, hexanoic acid, and platinum oleate.

2.9 g of nickel nitrate (Ni ($NO_3$)$_2$) and 2.32 g of hexanoic acid (HOOC—($CH_2$)$_4$—$CH_3$) and 0.696 g of platinum oleate, Pt[OOC—($CH_2$)$_7$—CH=CH—($CH_2$)$_7$—$CH_3$]$_4$, were dissolved in 100 mL of THF solvent at room temperature. This dispersion of nickel nitrate, hexanoic acid and platinum oleate was processed as the precursor solution as utilized in connection with the aerosol process described above with reference to FIG. 1. Nanometer size, porous hollow, spherical particles of $Ni_{19}Pt_1$ alloy-carbon were thus obtained. Their composition was confirmed by X-ray diffraction, and energy-dispersive X-ray microanalysis. A transmission electron microscope image of some of the spherical $Ni_{19}Pt_1$ alloy particles is presented in FIG. 3B. The scale-bar in FIG. 3B represents 100 nanometers.

Figure 3C:
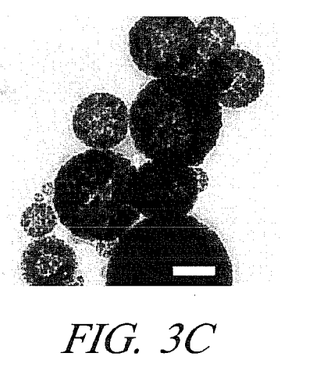
FIG. 3C illustrates hollow nickel-carbon composite spheres made using nickel nitrate and poly (oxyethylene)$_4$-lauryl ether ($C_{20}H_{42}O_5$). The scale-bars in the respective figures represent one hundred nanometers in length.

2.9 g of nickel nitrate (Ni ($NO_3$)$_2$) and 2.9 g of Brij®30 poly (oxyethylene)$_4$ lauryl ether: ($C_{20}H_{42}O_5$) were dissolved in 100 mL of THF solvent at room temperature. This dispersion of nickel nitrate and Brij®30 was processed as the precursor solution as utilized in connection with the aerosol process described above with reference to FIG. 1. Nanometer size, porous hollow, spherical particles of nickel-carbon were thus obtained. Their composition was confirmed by X-ray diffraction, and energy-dispersive X-ray microanalysis. A transmission electron microscope image of some of the spherical nickel particles is presented in FIG. 3C. The scale bar in FIG. 3C represents 100 nanometers.

Figure 4A:
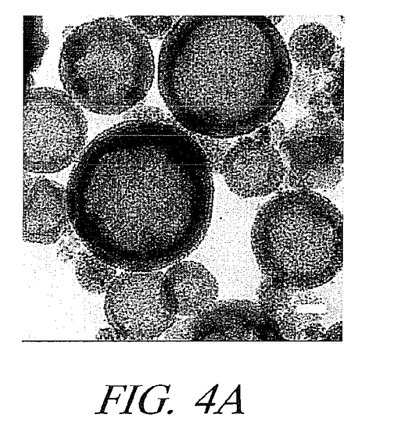
FIG. 4A illustrates hollow Ni—C spheres made using nickel nitrate and oleic acid.

5.8 g of nickel nitrate (Ni($NO_3$)$_2$) and 2.82 g of oleic acid (HOOC—($CH_2$)$_7$—CH=CH—($CH_2$)$_7$—$CH_3$) were dissolved in 100 mL of THF solvent at the mole ratio of 2:1 between nickel nitrate and oleic acid. This precursor solution of nickel nitrate and oleic acid mixture was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 4A. The scale bar in FIG. 4A represents 100 nanometers.

Figure 4B:
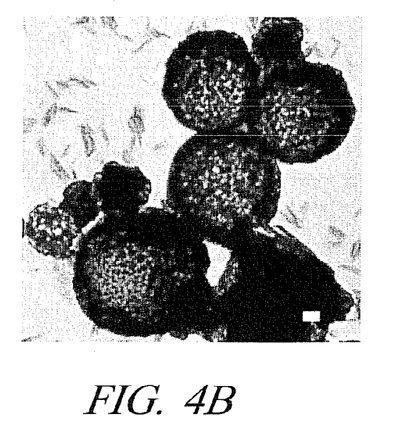
FIG. 4B illustrates Ni—C spheres made using nickel nitrate and P123 block copolymer of polyethylene glycol and polypropylene glycol. The scale-bars represent one hundred nanometers in length.

5 g of nickel nitrate (Ni($NO_3$)$_2$) and 1 g of P123 block-co-polymer (poly(ethylene glycol)-block-polypropylene glycol-block-poly(ethylene glycol): HO($CH_2CH_2O$)$_{20}$($CH_2CH(CH_3)O$)$_{70}$($CH_2CH_2O$)$_{20}$H) were dissolved in 100 mL of DI-water at the weight ratio of 5:1 between nickel nitrate and P123 block-co-polymer. This precursor solution of nickel nitrate and P123 block-co-polymer mixture was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 4B. The scale bar in FIG. 4B represents 100 nanometers.

Figure 5:
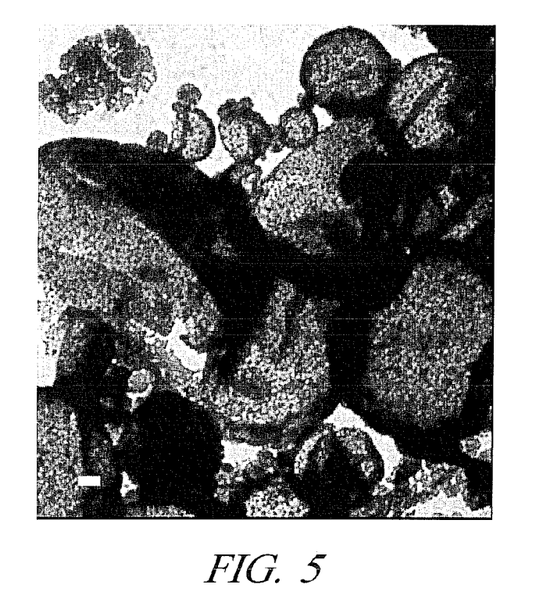
FIG. 5 illustrates hollow nickel-carbon composite spheres made using two molar portions of nickel chloride and one molar portion of oleic acid. The scale-bar represents one hundred nanometers.

5.74 g of nickel chloride ($NiCl_2 6H_2O$) and 2.82 g of oleic acid were dissolved in 100 mL of absolute methanol solvent at the mole ratio of 2:1 between nickel chloride and oleic acid. The mixture of nickel chloride and oleic acid was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 5. The scale bar in FIG. 5 represents 100 nanometers.

Figure 6A:
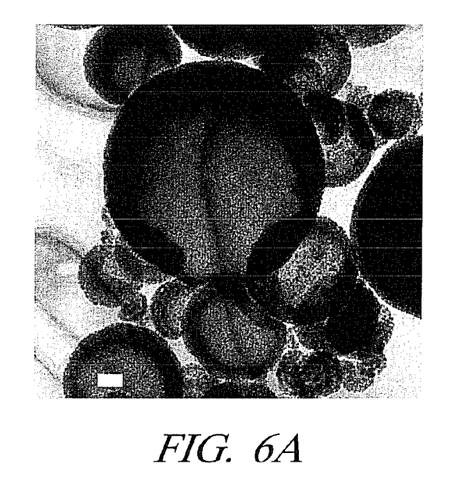
FIG. 6A illustrates hollow nickel-carbon composite spheres made using nickel nitrate and oleic acid, with the addition of formic acid.

5.8 g of nickel nitrate (Ni($NO_3$)$_2$) and 2.82 g of oleic acid were dissolved in 100 mL of absolute methanol solvent with addition of 1 mL of formic acid at the mole ratio of 2:1 between nickel nitrate and oleic acid. The mixture of nickel nitrate, oleic acid, and formic acid was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 6A. The scale-bar in FIG. 6A represents 100 nanometers.

Figure 6B:
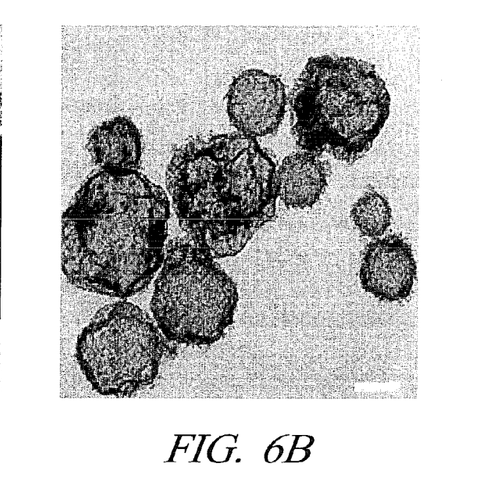
FIG. 6B illustrates hollow nickel-carbon particles made using nickel nitrate and P123 block co-polymer, with the addition of hydrochloric acid. The scale-bars represent one hundred nanometers in length.

5 g of nickel nitrate (Ni($NO_3$)$_2$) and 1 g of P123 block-co-polymer were dissolved in 100 mL of DI-water with the addition of 1 mL of hydrochloric acid at the weight ratio of 5:1 between nickel nitrate and P123 block-co-polymer. This precursor solution of nickel nitrate, P123 block-co-polymer, and hydrochloric acid mixture was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 6B. The scale-bar in FIG. 6B represents 100 nanometers.

There are visual differences between the respective particles illustrated in FIGS. 3A to FIG. 6B. And physical differences between metal-carbon composite particles prepared from different precursors may also be observed when the particles are use in different applications, such as in a catalysis application.

Template Method

In addition to above specifications as for fabrication of hollow material based on non-template method, hollow nickel spheres, hollow platinum spheres, and hollow nickel and platinum alloy spheres of Ni:Pt=19:1 and Ni:Pt=3:1 at the mole ratio were prepared using spherical polystyrene spheres of about 120 nanometer diameters. Nickel oleate, Ni [OOC—

$(CH_2)_7$—CH=CH—$(CH_2)_7$—$CH_3]_2$ and platinum oleate, Pt [OOC—$(CH_2)_7$—CH=CH—$(CH_2)_7$—$CH_3]_4$ were prepared as described above in this specification.

Figure 2A:
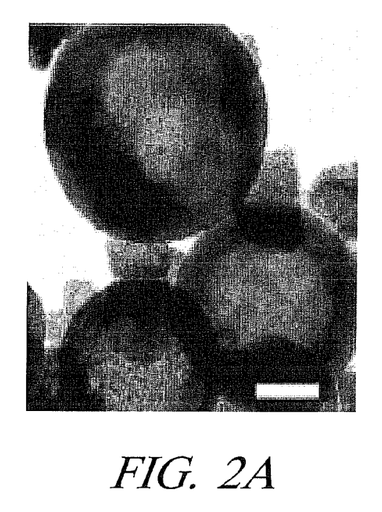
FIG. 2A illustrates hollow nickel spheres.

6.21 g of nickel oleate was dissolved in 100 mL of THF at room temperature. Then, 0.9315 g of polystyrene spheres was homogeneously dispersed with the solution of nickel oleate. The mixing ratio of nickel oleate to polystyrene was about 1:0.15 at the weight ratio. Typically, we used nickel oleate of 6.21 g and polystyrene of 0.9315 g. This dispersion of nickel oleate and polystyrene was processed as the precursor solution as utilized in connection with the aerosol process described above with reference to FIG. 1. Nanometer size, porous hollow, spherical particles of nickel-carbon composite were thus obtained. Their composition was confirmed by X-ray diffraction, and energy-dispersive X-ray microanalysis. A transmission electron microscope image of some of the spherical nickel particles is presented in FIG. 2A. The scale bar in FIG. 2A represents 100 nanometers.

Figure 2B:
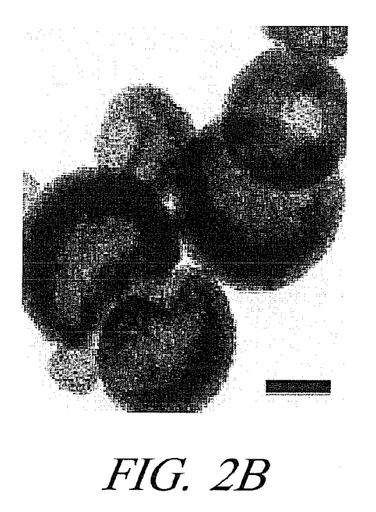
Figure 2C:
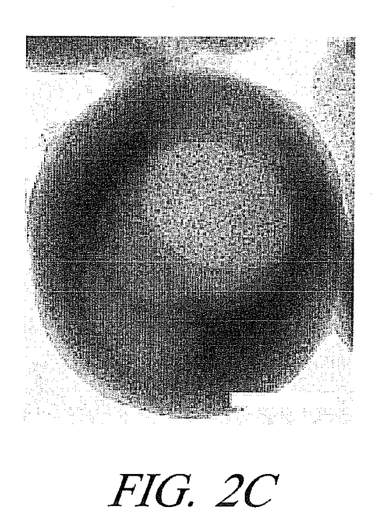
Figure 2D:
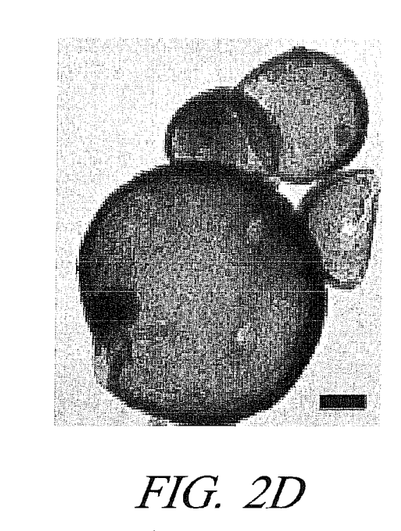

Similarly, 13.23 g of platinum oleate was dissolved in 100 mL of THF and mixed with a like molar proportion of polystyrene spheres. This dispersion of platinum oleate and polystyrene was processed as the precursor solution as utilized in connection with the aerosol process described above with reference to FIG. 1. Nanometer size, porous hollow, spherical particles of platinum-carbon composite were thus obtained. Their composition was confirmed by X-ray diffraction, and energy-dispersive X-ray microanalysis. A transmission electron microscope image of some of the spherical platinum-carbon composite particles is presented in FIG. 2D.

A first mixture of nickel oleate (11.837 g) and platinum oleate (1.323 g) were dissolved in 100 mL of THF under sonication at room temperature for making $Ni_{19}Pt_1$ alloy where a nickel to platinum molar ratio is 19:1. 1.974 g of nanometer size polystyrene particles was dispersed in the precursor solution of nickel (11.837 g) and platinum oleates (1.323 g) as above. A second mixture of nickel oleate (1.869 g) and platinum oleate (1.323 g) was prepared for making $Ni_3Pt_1$ alloy where a nickel to platinum molar ratio is 3:1, and polystyrene spheres (0.4788 g) were added and dispersed in the inorganic precursor solution. The first mixture of nickel and platinum oleates and their second mixture were separately processed as precursor solutions as utilized in connection with the aerosol process described above with reference to FIG. 1. Nanometer size, porous hollow, spherical particles of $Ni_{19}Pt_1$—C and of $Ni_3Pt_1$—C were thus obtained. Their respective compositions were confirmed by X-ray diffraction, and energy-dispersive X-ray microanalysis. A transmission electron microscope image of some of the spherical $Ni_{19}Pt_1$—C particles is presented in FIG. 2B. A transmission electron microscope image of some of the spherical $Ni_3Pt_1$—C particles is presented in FIG. 2C.

There are visual differences between the respective particles illustrated in FIGS. 2A-2D. And physical differences between metal particles prepared from different precursors may also be observed when the particles are use in different applications, such as in a catalysis application.

Catalyst Tests

Hydrogenation reaction of propylene was carried out with the various catalysts prepared as above to investigate the effect of morphology on the catalytic properties of the respective particles. Particularly, samples with hollow and non-hollow structures were compared. Ni or NiPt particles were prepared either in the hollow structures (by methods described above) or in non-hollow structures (by other processes) and they were each employed as a catalyst for the hydrogenation reaction. The catalytic behavior can be enhanced by modification of morphology. More specifically, the porous metal alloy spheres prepared as described above possess some prominent advantages over their bulk counterparts since structural geometry endows them with beneficial properties of low density, high surface areas, extra interior reaction space, and a savings on material. In addition, the porous sub-micrometer-sized spheres consisted of firmly combined alloy nanosize particles can provide a great quantity of catalytic sites and, meanwhile, avoid the aggregation of small catalyst particles.

Hydrogenation reactions showed that hollow Ni—C particles prepared based on the subject template method showed superior catalytic performance to that of non-hollow porous nickel catalyst particles. Nitrogen gas sorption behavior including surface area and pore size distribution was investigated for both non-hollow and hollow porous Ni. The adsorption data of non-hollow Ni exhibited a somewhat larger BET surface area of 204.4 $m^2/g$ than that of the subject hollow Ni particles (188.96 $m^2/g$) while pore size distribution was almost the same [pore size (max): non-hollow Ni (3.43 nm), hollow Ni (3.55 nm)] as obtained from desorption branch in the curve. Hence, it is believed that Ni hollow structure provides more active sites for the hydrogenation reaction than nickel with non-hollow structure does despite its smaller surface area. In the same vein, hollow NiPt—C alloy ($Ni_{19}Pt_1$—C) showed superior hydrogenation performance over non-hollow NiPt—C alloy with higher Pt moiety ($Ni_3Pt_1$—C). This result implied that controlling morphology of material embracing Ni or NiPt catalyst permits the use of hydrogenation catalysts (and possibly other applications) with a significantly lower platinum content than the non-hollow NiPt catalyst with corresponding catalytic activity.

A further illustration of the effect of morphology of the subject spherical metal particles on catalytic properties in the hydrogenation of propylene is seen by carrying out the hydrogenation reaction employing various metal catalysts with different organic ligands. For example, Ni-ligands complex were prepared using hexanoic acid and decanoic acid and hollow spherical nickel particles were prepared from each precursor. It was found that the hollow spherical nickel particles prepared from nickel-hexanoic acid precursor (the shorter molecular chain with a lower degradation temperature) showed better catalytic performance than its decanoic acid precursor in the hydrogenation of propylene.

Since hollow metal particle structure provides more active sites in the catalyst than non-hollow structures, the catalytic activity of the nickel spherical particles adopted with shorter ligand chain in the precursor demonstrated better catalytic performance in this specific application. The sorption behavior of nickel prepared with different aliphatic acids of organic ligands was investigated and it showed that the surface area increases from 179 $m^2/g$ to 248 $m^2/g$ at the same time the microporous area increases from 5.6 $m^2/g$ to 29.8 $m^2/g$ with an increase of alkyl chain length or increased number of carbon of aliphatic acid.

Since the metal particles with organic ligand of shorter molecular chain lengths are prone to form a more hollow structure than ligands with longer organic chains, more active sites are exposed to a reactant thereby increasing catalytic activity. The increase of micro-porosity is ascribed to the increased amount of carbon from the organic ligands remained in the pore even after calcinations. Pure metal (Ni) amount of the material decreases with an increase of alkyl chain length of organic aliphatic acids as organic ligands. This result is extendible to application of NiPt alloy to hydrogenation catalysts. NiPt alloys prepared with organic ligands with different chain lengths gave out NiPt alloy with different morphologies which were used as catalysts in the propylene hydrogenation reaction.

As described above in this specification, variation in the formulation of the metal-organic ligand complex precursor material often produces changes in the morphology of the metal particles obtained from the aerosol process with its thermal degradation of the ligand material. Thus, while the hollow porous spherical metal particles produced by methods of this invention have many catalytic and other applications, a preferred morphology of the particles for an application may be determined by providing and evaluating different metal compositions prepared from varying precursor compositions.

The specific embodiments of practices of the invention that have been described are only for the purpose of illustration and not to be construed as limiting the scope of the invention.

The invention claimed is:

1. A method of making hollow spherical particles that are a composite of one or more elemental metals and elemental carbon, the method comprising:
   forming a dispersion of a precursor material in a liquid vehicle, the precursor material comprising at least one of (i) ions of one or more metal elements and an organic ligand and (ii) a metal-organic ligand compound of each of one or more metal elements;
   forming an aerosol of the liquid-dispersed precursor material in a stream of inert gas; and
   heating the aerosol in the stream to remove the liquid, decompose organic ligand material and form porous, hollow spherical particles of a composite of the one or more elemental metals and elemental carbon.

2. A method of making hollow spherical particles as recited in claim 1 comprising forming a dispersion of ions of at least one metal and an organic ligand, the organic ligand being a molecule whose molecular weight is less than 150,000 and which contains a saturated or unsaturated carbon chain with at least one of a mercapto group, an amine group, a carboxylic group, and a hydroxyl group and which serves as a structure directing agent for the formation of the porous hollow spherical particles.

3. A method of making hollow spherical particles as recited in claim 2 in which a dispersion of ions of at least one metal is formed by adding to the liquid one or more salts of a metal are selected from the group consisting of metal nitrate, metal chloride, and metal acetate.

4. A method of making hollow spherical particles as recited in claim 3 in which an inorganic acid is added to the dispersion of metal ions and organic ligand to a predetermined level of acidity.

5. A method of making hollow spherical particles as recited in claim 2 in which the molar/weight ratio of metal ions to organic ligand is in the range of from 2:1 to 1:20.

6. A method of making hollow spherical particles as recited in claim 2 in which one or more organic ligands are dispersed in the liquid, each organic ligand being one of (a) hydrocarbon molecules containing a functional group selected from the group consisting of mercapto groups, amine groups, carboxylic groups, and hydroxyl groups, (b) oxyethylene group-containing alcohols and ethers, (c) aliphatic acids, and (d) polyacrylic acid.

7. A method of making hollow spherical particles as recited in claim 2 in which template particles are added to the liquid dispersion, the template particles serving to shape the hollow metal-carbon particles.

8. A method of making hollow spherical particles as recited in claim 7 in which the template particles are one or more materials selected from the group consisting of carbon particles, silica particles, carbon nanotubes, vesicle liquid droplets, emulsion droplets, colloid and polymer particles including porous polymer monoliths, resin spheres, polyaniline, poly (methyl methacrylate), polypyrrole, and melamine formaldehyde polymer particles.

9. A method of making hollow spherical particles as recited in claim 1 in which a metal-organic ligand compound of each of the one or more metallic elements is added to the liquid dispersion.

10. A method of making hollow spherical particles of one or more elemental metals as recited in claim 9 in which nanometer-size template particles of a separate material are dispersed in the liquid vehicle with precursor material, the separate template particles also serving to contribute to the shaping of the hollow metal particles.

11. A method of making hollow spherical particles of one or more elemental metals as recited in claim 9 in which each metal-organic ligand compound comprises an organic ligand which is one of (a) hydrocarbon molecules containing a functional group selected from the group consisting of mercapto groups, amine groups, carboxylic groups, and hydroxyl groups, (b) oxyethylene group-containing alcohols and ethers, (c) an aliphatic acid, and (d) polyacrylic acid.

12. A method of making hollow spherical particles of one or more elemental metals as recited in claim 10 in which the separate template particles are one or more materials selected from the group consisting of carbon particles, silica particles, carbon nanotubes, vesicles liquid droplets, emulsion droplets, colloid and polymer particles including porous polymer monoliths, resin spheres, polyaniline, poly (methyl methacrylate), polypyrrole, and melamine formaldehyde polymer particles.

13. A method of making hollow spherical particles as recited in claim 9 in which the liquid vehicle comprises tetrahydrofuran.

14. A method of making hollow spherical particles as recited in claim 1 in which the liquid vehicle comprises tetrahydrofuran.

15. A method of making hollow spherical particles of one or more elemental metals as recited in claim 1 in which the aerosol is heated to a temperature of at least about 400° C.

16. A method of making hollow spherical particles of one or more elemental metals as recited in claim 1 in which the elemental metals are at least one of nickel and platinum.

17. A method of making porous hollow spherical particles that are a composite of one or more elemental metals and elemental carbon, the metal content being more than fifty percent by weight of the composite, the method comprising:
   forming a dispersion of a precursor material in a liquid vehicle, the precursor comprising ions of one or more metal elements and an organic ligand, in which the organic ligand comprises at least one of an aliphatic acid, an oxyethylene group-containing alcohol, an oxyethylene group containing ether, and polyacrylic acid, the molar ratio of metal ions to organic ligand being in the range from 2:1 to 1:20 at the mole or weight ratio, where the organic ligand serves as a structure directing agent for the formation of the porous hollow spherical particles;
   forming an aerosol of the liquid-dispersed precursor material in a stream of inert gas; and
   heating the aerosol in the stream to remove the liquid, decompose organic ligand material and form porous, hollow spherical particles of a composite of the one or more elemental metals and elemental carbon.

18. A method of making porous hollow spherical particles as recited in claim 17 in which the liquid vehicle comprises tetrahydrofuran.

19. A method of making porous hollow spherical particles that are a composite of one or more elemental metals and elemental carbon, the metal content being more than fifty percent by weight of the composite, the method comprising:

forming a dispersion of a precursor material and nanometer-size particles of a template material in a liquid vehicle, the precursor material comprising a metal-organic ligand compound of each of one or more metal elements, each metal-organic ligand compound comprising an organic ligand which is at least one of an aliphatic acid, an oxyethylene group-containing alcohol, an oxyethylene group containing ether, and polyacrylic acid;

forming an aerosol of the liquid-dispersed precursor material in a stream of inert gas; and heating the aerosol in the stream to remove the liquid, decompose organic ligand material and form porous, hollow spherical particles of a composite of the one or more elemental metals and elemental carbon.

20. A method of making porous hollow spherical particles as recited in claim 19 in which the liquid vehicle comprises tetrahydrofuran.

* * * * *